United States Patent

[11] 3,607,273

| [72] | Inventor | Layton C. Kinney<br>Chicago, Ill. |
|---|---|---|
| [21] | Appl. No. | 621,581 |
| [22] | Filed | Mar. 8, 1967 |
| [45] | Patented | Sept. 21, 1971 |
| [73] | Assignee | American Screen Process Equipment Company<br>Chicago, Ill. |

[54] IMAGE FORMATION BY SELECTIVE FOAM GENERATION
6 Claims, 4 Drawing Figs.

| [52] | U.S. Cl. | 96/35 |
|---|---|---|
| [51] | Int. Cl. | G03c 5/00 |
| [50] | Field of Search | 96/35, 48 HD; 117/93.31 |

[56] References Cited
UNITED STATES PATENTS

| 3,171,743 | 3/1965 | Peticdas | 96/48 |
|---|---|---|---|
| 3,298,833 | 1/1967 | Gaynor | 96/75 |
| 3,485,631 | 12/1969 | Notley | 96/48 |
| 2,317,789 | 4/1943 | Marriott | 96/88 |
| 1,954,325 | 4/1934 | Martinez | 96/35 |
| 3,093,478 | 6/1963 | Peterson et al. | 96/35 |

*Primary Examiner*—David Klein
*Attorney*—Robert E. Wagner

ABSTRACT: A substrate having a color such that it absorbs a substantial amount of the visible spectrum is covered over with a thin layer of material which foams or expands in response to heat. An image-forming member such as a positive transparency is positioned over the foaming layer and a light source is flashed therethrough to the foaming layer. The foaming layer expands under the light-transmitting regions of the transparency and remains substantially unaffected over the other regions. Where the material is foamed, when light is applied it scatters the light. Where is is not foamed, it does not. Accordingly, an image is formed on the surface of the substrate by this technique.

PATENTED SEP 21 1971                3,607,273

INVENTOR
LAYTON C. KINNEY
BY Lindenberg & Freilich
ATTORNEYS

IMAGE FORMATION BY SELECTIVE FOAM GENERATION

BACKGROUND OF THE INVENTION

Field of the Invention

This invention enables the obtention of an image from a transparency in a manner that resembles the photographic process in the use of a light source which selectively illuminates the sensitized element through a transparency, but differs therefrom in the nature of the "sensitized" surface. Another system for obtaining an image using a light flash technique is described and claimed in an application for patent, Ser. No. 568,692, filed July 14, 1966, by this inventor and Edwin H. Tompkins, which is entitled, "METHOD OF TRANSFERRING INFORMATION." Therein, the sensitized surface contains a pyrolyzable material. Accordingly, in response to the flash illumination of the sensitized surface through the transparency, those regions of the transparency which pass the heat energy from the flash source will cause the portions of the sensitized surface thereunder to be removed by pyrolyzation. As will be seen in the subsequent description hereunder, the present invention produces an image by the selective foaming of the sensitized layer in response to heat passed through the transparency.

SUMMARY

This invention provides a novel and unique arrangement for the formation of an image upon a substrate which has heat-absorbing properties which are different than the properties of the material coated upon the substrate. A thin coating of a material which foams or expands noticeably when exposed to heat above a threshold temperature is placed upon the substrate. The material is substantially transparent in the unfoamed state. A desired image represented either by a film transparency having an image thereon or by a mask with image openings thereon is positioned fairly close to the coated surface. Radiant energy is then flashed through the transparency or mask onto the coated substrate. The substrate is provided with a color, preferably black, which can be seen through the unfoamed coating. The substrate will become heated where the radiant energy passes through the transparent portions of the film or openings in the mask, and will thus heat the regions of the coating corresponding thereto above the threshold temperature whereupon it will foam or swell.

The portion of the coated substrate which is foamed serves to scatter light and therefore appears white while the unfoamed portions are substantially transparent and the substrate is seen therethrough. Accordingly, an image is seen upon the coated substrate in black and white, which is a reproduction of the image in the transparency, or the mask openings.

DESCRIPTION OF THE PREFERRED EMBODIMENTS

Figure 1:
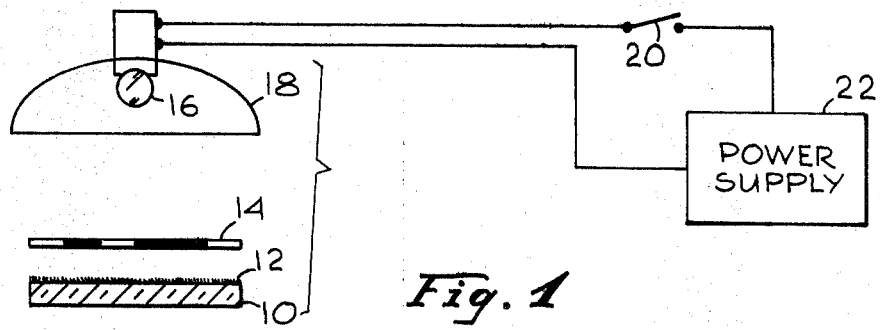
FIG. 1 is an edge view illustrating an arrangement for forming an image in accordance with this invention.

In accordance with this invention, a substrate 10, which may be black paper, black plastic, or any other substrate having suitable thermal properties, may be coated with a thin transparent coating 12 of a material, which either itself has or may be given, the property, by appropriate treatment, of foaming or expanding when it is heated above a threshold level. For example, in accordance with this invention, the substrate 10 may be coated with a thin transparent coating of polystyrene.

This coating may either be cast from a solvent solution in which the substrate is placed or a thin film may be heat laminated to the substrate, or may be sprayed thereon. These techniques for applying a thin coating of a polystyrene to a substrate are well known in the art and accordingly will not be gone into here. A coating of 0.1 to 2 mils thickness is preferable.

After all the solvent for the polystyrene is removed, the substrate and film are exposed for several hours to an atmosphere of pentane vapor. The purpose for doing this is to permit the pentane vapor to diffuse into the polystyrene thoroughly.

A positive film transparency 14 is then placed over and adjacent to the coating 12. A light-heat source, such as an electronic flash lamp 16 within a reflector 18, is positioned over the transparency 14. By closing the switch 20, current from power supply 22 is applied to the flash lamp 16 causing it to flash and illuminate the substrate coating 12 through the transparency 14.

In those regions where light from the flash lamp can pass through the transparency 14, it passes through the thin polystyrene coating and causes the underlying colored substrate to heat up. As a result, the overlying polystyrene softens, and at the same time, the heat causes the pentane to expand, causing bubble formation. Thus, a thin film of polystyrene foam is formed in the illuminated areas.

Figure 2:
FIG. 2 illustrates the appearance of the substrate and foam coating after flashing.
Figure 3:
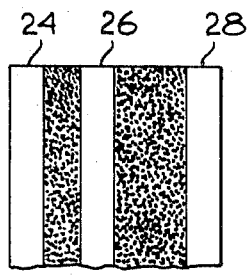
FIG. 3 represents the appearance of an image made in accordance with this invention on a surface which has been formed as taught by this invention.

Since polystyrene is an excellent light scatterer, the foamed areas now appear nearly white. An exaggerated view of the foamed areas 24, 26, 28, corresponding to the substantially transparent areas of the transparency 14, is shown in FIG. 2 of the drawings. The film of foamed styrofoam is slightly thicker than the remainder of the film, but this does not detract from the excellent resolution and sharpness of print which is available. The foaming agent, namely pentane, is the one normally used in making polystyrene foam. Those regions of the coating which are not foamed remain black in appearance as may be seen by viewing FIG. 3, since light falling on the unfoamed regions is transmitted through the thin coating of polystyrene and therefore is absorbed by the underlying black substrate. While a black substrate is preferable, other colors which absorb heat may also be used. As one departs from the color black, the temperature to which the substrate heats up in response to the light-heat flash source may be reduced. However, this may be compensated for by increasing the size of the flash lamp which is used or by using multiple flash lamps or multiple flashes.

The temperature threshold which must be exceeded to produce a foaming action varies with the materials and foaming agent used, but with the materials specified herein, temperatures between 90 to 100° C. produce foaming.

In place of pentane, higher boiling agents, such as nonane or octane, may also be employed.

While the heat image for selective foaming of the foaming coating has been described as being applied from the "coating side" it is also feasible to apply the heat image to the coating from the substrate side, i.e. through the substrate. This is not the preferred method however, since there is some loss in sharpness of the resulting foamed image. It also is possible, and within the scope of this invention to provide a foamed image by drawing with a heated stylus on the unfoamed coating, or on the substrate on which the coating is applied.

Figure 4:
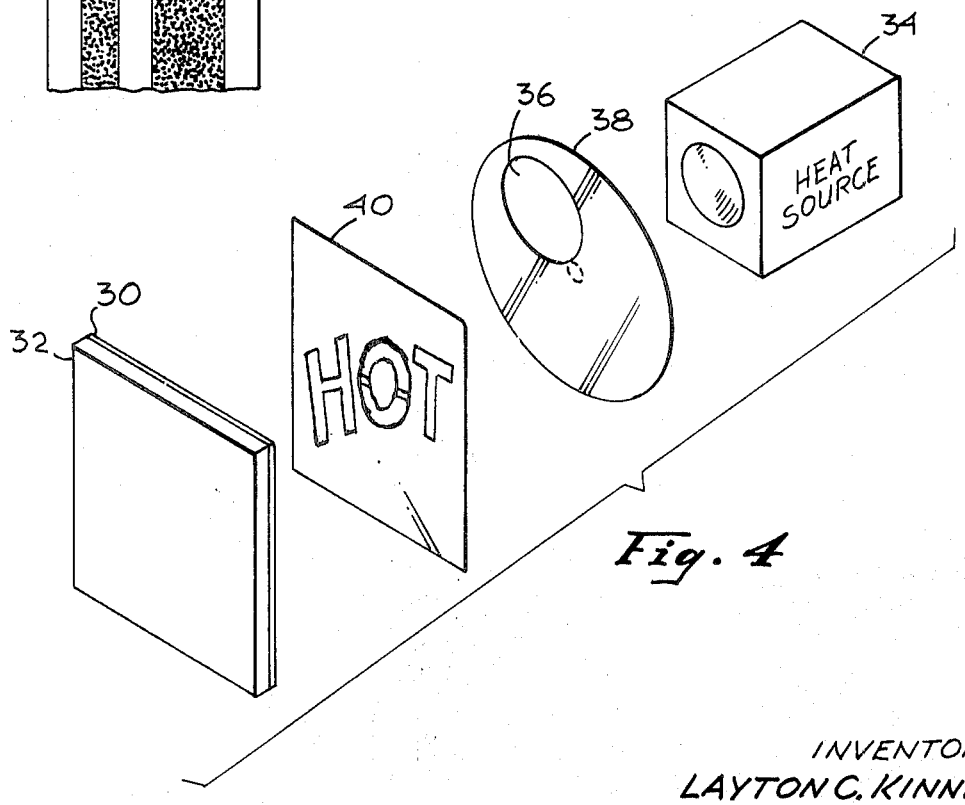
FIG. 4 illustrates in perspective, another arrangement for selectively heating and thereby forming a foamed image on a foam coating, in accordance with this invention.

FIG. 4 shows another arrangement for selectively foaming the foamable coating 30 on a substrate 32, in accordance with this invention, using a heat image. A source of heat 34, such as an infrared lamp is permitted to direct heat through the opening 36 in a rotatable shutter device 38, and thereafter through an apertured mask 40, only long enough to cause the image formed by the mask openings to be created on the foamable coating.

There has accordingly been described and shown herein a novel, useful and unique method and means for forming an image using an image forming member which has an image which selectively passes light or radiant energy for light by the selective foaming of a material which has the property of foaming in the presence of heat above a predetermined temperature threshold. By light or radiant energy is here meant a spectrum between the middle infrared region through the visible region to the far ultraviolet, which encompasses approximately the region from 100,000 to 2,000 A.

What is claimed is:

1. A method of directly producing a visible image comprising the steps of: positioning an imaging member in front of a radiant image source, said member comprising a thin transparent coating of polystyrene containing an aliphatic hydrocarbon foaming agent, said coating being selectively expandable at a predetermined threshold temperature to form a light-scattering, reflective portion corresponding to said image and transparent nonexpanded portions and a substrate having a colored surface capable of absorbing a substantial amount of radiant energy within the visible spectrum between 2,000 A. and 100,000 A. directly underlying said coating; and energizing said radiant image source to apply said radiant image to said coating for a time sufficient to permit said radiant energy to penetrate said transparent coating and heat the surface of the substrate to said threshold temperature, selectively expanding the overlying portion of the coating to form a corresponding light-reflective image contrasting darker appearing nonexpanded portions of the transparent coating and underlying substrate.

2. A method as recited in claim 1 in which said surface is colored black and said threshold temperature is from 90° C. to 100° C.

3. A method according to claim 1 in which said foaming agent is an alkane hydrocarbon containing five to nine carbon atoms.

4. A method according to claim 1 in which said foaming agent is incorporated into said film by applying the film to said surface and exposing the film to vapors of the aliphatic hydrocarbon for several hours.

5. A method according to claim 1 in which said radiant image source is formed by positioning an image transparency between a radiant energy source and said coating.

6. A method according to claim 1 in which said radiant energy source is a flash lamp.